(No Model.)
S. H. SHORT.
GEARLESS MOTOR FOR ELECTRIC RAILWAY CARS.
No. 473,365. Patented Apr. 19, 1892.
FIG. I.
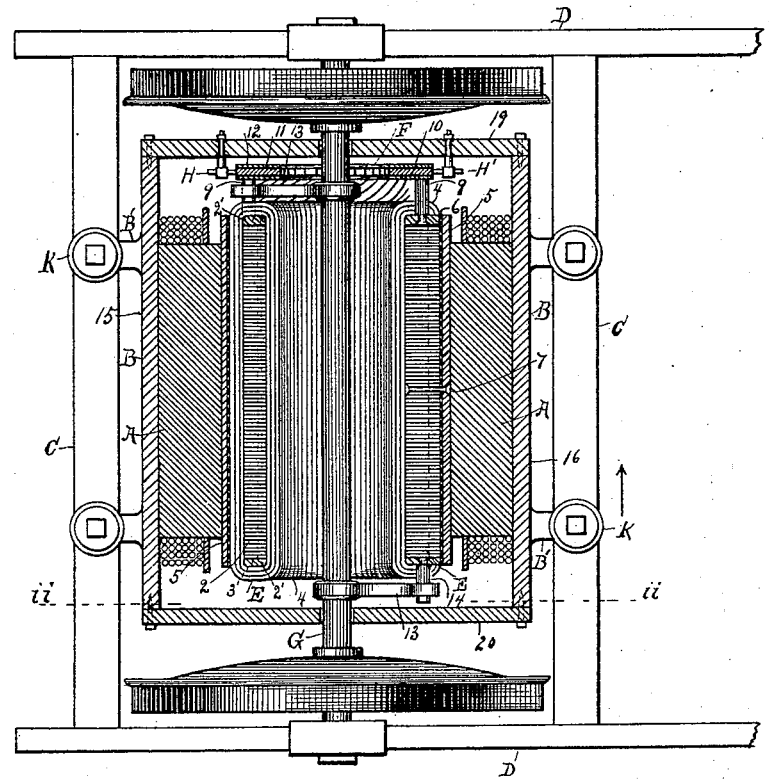
FIG. II.
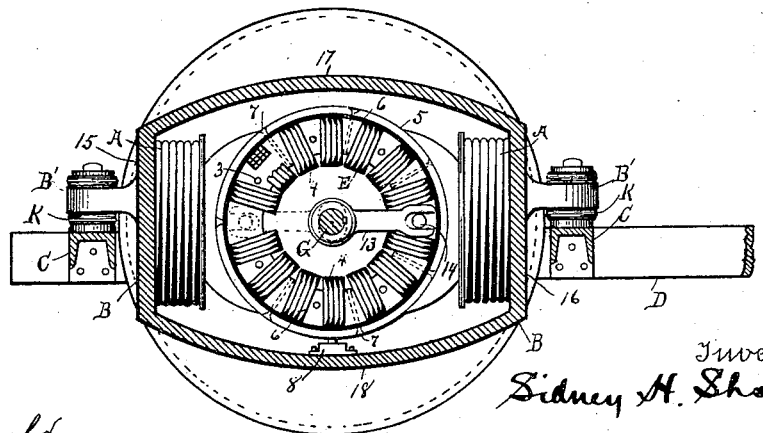
Witnesses.
R. E. Auld.
G. F. Downing.
Inventor
Sidney H. Short
By H. A. Seymour
Attorney.

UNITED STATES PATENT OFFICE.

SIDNEY H. SHORT, OF CLEVELAND, OHIO.

GEARLESS MOTOR FOR ELECTRIC-RAILWAY CARS.

SPECIFICATION forming part of Letters Patent No. 473,365, dated April 19, 1892.

Application filed June 24, 1891. Serial No. 397,367. (No model.)

*To all whom it may concern:*

Be it known that I, SIDNEY H. SHORT, of Cleveland, in the county of Cuyahoga and State of Ohio, have invented certain new and useful Improvements in Gearless Motors for Electric-Railway Cars; and I do hereby declare the following to be a full, clear, and exact description of the invention, such as will enable others skilled in the art to which it appertains to make and use the same.

This invention relates more particularly to the propelling-motors of electric-railway cars in which the armatures are axially placed with reference to the driving-axles and are directly connected therewith, so that reducing-gear is not necessary for the transmission of power from the motors to the driving-axles; but each of the improvements is included for all the uses to which it may be adapted. By "axially placed" is to be understood that the axes of the motor-armature and driving-axle are coincident, or nearly so, and by "directly connected" is to be understood that the armature makes one revolution to each turn of the driving-axle.

Heretofore I have devised an arrangement having an axially-placed and directly-connected armature mounted on a sleeve, which surrounds the car-axle with sufficient clearance for the motor to ride easy on its springs, and which, projecting suitably beyond the armature, is journaled in bearings in the motor-frame. This sleeve, while advantageous in many respects, adds considerably to the weight and cost of the motor.

One feature of the present invention consists in journaling the armature in bearings at its periphery, thus enabling the long sleeve aforesaid to be dispensed with.

A further improvement consists in making the axially-placed and directly-connected armature to turn in contact with the field-poles, thus enabling the magnetic resistance between the poles to be reduced to a minimum and the weight of the motor to be correspondingly reduced. Practically it is designed to combine these two features by having an armature to the periphery of which the field-poles are presented and for which the peripheral bearings are constituted by the field-magnets themselves; but the invention covers the two features separately, as well as the combination of both, and the special construction embodying them both in the form of a machine with poles presented to the periphery of the armature.

A further feature of invention consists in a commutator carried directly by the armature-core instead of by a solid or a hollow armature-shaft. This feature is covered generally, as well as in connection with an armature journaled in peripherical bearings. It may be made in various ways. A suitable way is to provide projections, pins, or brackets from the armature-core between the bobbins and to support the commutator by these projections, pins, or brackets.

An additional feature of invention consists in maintaining the armature and field-magnets of a propelling-motor with axially-placed and directly-connected armature in proper relation to each other by the magnetic attraction.

The invention further consists in operating the driving-axle directly from the armature-core through a self-adjusting driver.

The invention also comprises the other new features or combinations of features hereinafter particularly pointed out.

A machine embodying one or more of the new features or combinations of this invention may be employed in other connections than in locomotives, and the invention extends to the said features or combinations in general, as well as to the application of the same to such gearless locomotives.

In the accompanying drawings, which form part of this specification, Figure I is a view in plan and horizontal section of a gearless propelling mechanism made in accordance with the invention; and Fig. II is a view in sectional elevation on line $i$ $i$ of Fig. I, looking in the direction of the arrow.

The field-magnets A are mounted on the magnetic-motor frame B, which is supported by the cross-bars C, these in turn being supported by the side bars D of the truck-frame, which are upheld by the journal-boxes of the car; but other known or suitable mountings for the magnets may be used. Springs or buffers K to make a yielding mounting for the motors are interposed between the projections B' on the motor-frame and the cross-bars C; but other arrangements could be used. The armature E is journaled at the periphery in bearings constituted by the field-magnets A, these being presented to the periphery of the armature. The armature-core is composed of a number of notched or toothed plates 2 of annular form, which are fastened together by rivets or pins 3, which may be insulated to preserve the effect of the lamination of the armature-core. At the outside are preferably heavier plates 2'. The bobbins 4 are wound about the ring in the usual way between the teeth thereon, and the periphery of the armature is inclosed in an annular shell 5, which is insulated at 6 from the core and is fastened thereto by a single central row of bare rivets 7, or it may be by other suitable means. The exterior surface of this shell 5 is turned up and slides in contact with the poles A.

At 8 is a lubricating-cup having a felt which dips into the lubricant and is forced up against the outside of shell 5.

As so far described, it will be observed that there is an open-center armature journaled at the periphery and turning in contact with the poles of the field-magnets A.

The commutator F is shown as mounted on the armature-core, there being pins 9 riveted or otherwise secured to one of the end plates 2' and fastened at the outer end to the ring 10, which forms the foundation for the commutator. The commutator-blocks 11 are fastened between the rings 12 and 10, being suitably insulated from them and from one another. Insulated rivets may pass through the rings and blocks to hold them together.

The armature is axially placed in reference to the car-axle G (or, in other words, surrounds the same) and transmits power thereto through a self-adjusting driver composed, as shown, of the arms 13, keyed on the car-axle and engaging pins projecting from the armature-core and working in slots in the ends of said arms. As shown, one of the arms engages one of the pins 9 and the other arm a pin 14 at the opposite end of the armature. There is sufficient play at the ends of the driving-arms 13 to allow the motor to adapt itself to the movement of the same on suitable springs or buffers K, interposed between the frame B and cross-bars C or at other suitable points. Springs may be interposed between the driving-arms and the armature.

The motor-frame shown is adapted to inclose the motor, so as to protect it from dirt. It comprises the sides 15, 16, 17, and 18, from which the magnets A project inward, and the ends 19 and 20, bolted thereto. The commutator-brushes H and H' are carried by the end 19.

The electricity to propel the car may be supplied in any suitable way, as from a line through a traveling contact or trolley or from a source of electricity on the car.

Instead of employing a ring-armature, it is evident that a drum could be used. The core could be made of plates, substantially as hereinbefore described, and be wound with the usual drum-winding, the bobbin-wires at the ends being arranged to leave a clear space for the car-axle. It is evident, also, that other modifications could be made. The machine could be made with four or more poles instead of with two only, as shown. So, also, the field-magnets might rotate and the armature be held stationary, or other modified arrangements could be employed.

Having fully described my invention, what I claim as new, and desire to secure by Letters Patent, is—

1. In a dynamo-electric machine, the combination, with its field-poles, of an open-center armature, armature-coils wound thereon, and a metal shell encircling the armature-coils, said shell or cylinder being supported in direct contact with the field-poles, whereby the latter constitute bearings for the armature, substantially as set forth.

2. The combination, with the driving-axle of a car, of a propelling-motor comprising an armature directly connected with the axle and encircling the same, said armature having its coils inclosed in a metal bearing which is supported in the poles of the field-magnet, substantially as set forth.

3. The combination, with the driving-axle of a car, of a propelling-motor provided with a yielding mounting and comprising an axially-placed and directly-connected armature having a metal bearing encircling its coils, and field-magnet poles in which said bearing is supported, substantially as set forth.

4. The combination, with the driving-axle of a car, of a propelling-motor inclosed in a casing surrounding the axle and yieldingly mounted on a frame supported by the axle, the armature being journaled in bearings at its periphery and arranged so as to insure a clearance between the axle and inside of the armature, substantially as set forth.

5. The combination, with the driving-axle of a car, of a casing encircling the axle and containing the field-magnets of a motor, said casing being yieldingly supported on opposite sides of the car-axle on a frame supported by the axle, and an open-center armature encircling the axle and constructed to form a clearance between its inner side and the axle, said armature having a peripheral bearing and yieldingly connected with the axle, substantially as set forth.

6. The combination, with the driving-axle of a car, of a propelling-motor located and supported in a casing which surrounds the axle and is yieldingly mounted on a frame supported by the axle-boxes, said armature having its coils inclosed within a metal shell or cylinder which is mounted in the field-magnet poles, substantially as described.

7. The combination, with the driving-axle of a car, of a propelling-motor disconnected from the car-body and yieldingly mounted on a frame supported by the axle-boxes, said motor comprising an open-center armature journaled in bearings at its periphery and provided with a driver attached to the armature-core, substantially as set forth.

8. The combination, with the driving-axle of a car, of a casing encircling the axle and inclosing the propelling-motor therein, said motor comprising field-magnets attached to the casing, an open-center armature journaled at its periphery in the field-magnets, and a driving connection between the axle and armature-core, substantially as set forth.

9. The combination, with the driving-axle of a car, of a casing encircling the axle and containing a propelling-motor, said motor comprising an armature having its coils inclosed in a metal shell which is mounted in contact with the field-magnet poles, substantially as set forth.

In testimony whereof I have signed this specification in the presence of two subscribing witnesses.

SIDNEY H. SHORT.

Witnesses:
JAS. F. HUGHES,
J. C. BELL.